(12) United States Patent
Shin et al.

(10) Patent No.: US 10,144,491 B2
(45) Date of Patent: Dec. 4, 2018

(54) FLOATING WIND POWER GENERATION DEVICE

(71) Applicant: UNIVERSITY OF ULSAN FOUNDATION FOR INDUSTRY COOPERATION, Ulsan (KR)

(72) Inventors: Hyun Kyoung Shin, Ulsan (KR); Dong Ju Kim, Ulsan (KR)

(73) Assignee: UNIVERSITY OF ULSAN FOUNDATION FOR INDUSTRY COOPERATION, Ulsan (KR)

(*) Notice: Subject to any disclaimer, the term of this patent is extended or adjusted under 35 U.S.C. 154(b) by 158 days.

(21) Appl. No.: 15/507,250

(22) PCT Filed: Jul. 13, 2015

(86) PCT No.: PCT/KR2015/007266
§ 371 (c)(1),
(2) Date: Feb. 28, 2017

(87) PCT Pub. No.: WO2016/043416
PCT Pub. Date: Mar. 24, 2016

(65) Prior Publication Data
US 2017/0253305 A1    Sep. 7, 2017

(30) Foreign Application Priority Data
Sep. 17, 2014    (KR) .................... 10-2014-0123723

(51) Int. Cl.
*B63B 35/44*        (2006.01)
*B63B 39/00*        (2006.01)
(Continued)

(52) U.S. Cl.
CPC .............. *B63B 35/44* (2013.01); *B63B 21/00* (2013.01); *B63B 39/005* (2013.01); *B63B 39/06* (2013.01);
(Continued)

(58) Field of Classification Search
CPC .......... B63B 2035/446; B63B 35/44–35/4413; B63B 2035/442–2035/4493;
(Continued)

(56) References Cited

U.S. PATENT DOCUMENTS

2004/0237872 A1*  12/2004  Markie ................... B63B 1/322
                                                        114/273
2014/0261134 A1*  9/2014   Van Aken ............... B63B 39/06
                                                        114/282

FOREIGN PATENT DOCUMENTS

JP    2010228503 A  *  10/2010
KR    10-0542332 B1    1/2006
(Continued)

OTHER PUBLICATIONS

International Search Report for PCT/KR2015/007266 dated Aug. 28, 2015 from Korean Intellectual Property Office.

*Primary Examiner* — Mark Laurenzi
*Assistant Examiner* — Xiaoting Hu
(74) *Attorney, Agent, or Firm* — Revolution IP, PLLC

(57) ABSTRACT

A floating wind power generation device comprises: a main buoyant body which has buoyancy and a space portion provided in the center; an auxiliary buoyant body which has buoyancy and is connected to the main buoyant body by being inserted into the space portion of the main buoyant body; a plurality of wind power generators which are vertically provided on top of the auxiliary buoyant body and generate power; a location control means which is connected to the main buoyant body and controls the location of the main buoyant body; an oscillation inhibiting means which is connected to the main buoyant body and enables the main buoyant body to maintain an equilibrium state by absorbing the sea waves; and a dock connection unit which is connected to the main buoyant body and enables a ship to lie at anchor on the sea.

6 Claims, 3 Drawing Sheets

(51) Int. Cl.
| | |
|---|---|
| *B63B 39/06* | (2006.01) |
| *B63B 39/10* | (2006.01) |
| *B63B 21/00* | (2006.01) |
| *F03B 13/16* | (2006.01) |
| *F03D 9/25* | (2016.01) |
| *F03D 13/25* | (2016.01) |
| *F03D 9/12* | (2016.01) |
| *F03D 15/10* | (2016.01) |
| *F03B 13/18* | (2006.01) |
| *B63B 1/04* | (2006.01) |

(52) U.S. Cl.
CPC .............. *B63B 39/10* (2013.01); *F03B 13/16* (2013.01); *F03B 13/1815* (2013.01); *F03D 9/12* (2016.05); *F03D 9/255* (2017.02); *F03D 13/25* (2016.05); *F03D 15/10* (2016.05); *B63B 2001/044* (2013.01); *B63B 2035/446* (2013.01); *B63B 2035/4466* (2013.01); *B63B 2039/105* (2013.01); *B63B 2241/12* (2013.01); *F05B 2240/93* (2013.01); *F05B 2240/95* (2013.01); *Y02E 10/38* (2013.01); *Y02E 10/727* (2013.01)

(58) Field of Classification Search
CPC ................. B63B 39/00–39/08; B63B 2039/063–2039/068; B63B 39/005; B63B 21/00; B63B 2001/044; B63B 2241/12; B63B 39/10; B63B 2039/105; Y02E 10/727; Y02E 10/38; F03D 13/25; F05B 2240/93; F05B 2240/95; F03B 13/16; F03B 13/1815

See application file for complete search history.

(56) References Cited

FOREIGN PATENT DOCUMENTS

| | | | | |
|---|---|---|---|---|
| KR | 20100123443 | A | * 11/2010 | |
| KR | 10-2012-0120679 | A | 11/2012 | |
| KR | 10-2013-0048853 | A | 5/2013 | |
| KR | 20130098779 | A | * 9/2013 | |
| KR | 10-2014-0035557 | A | 3/2014 | |
| KR | 20140035557 | A | * 3/2014 | |
| WO | WO 2015137535 | A1 | * 9/2015 | ............. B63B 35/44 |

* cited by examiner (a)　　　　　　　　　(b)

FLOATING WIND POWER GENERATION DEVICE

CROSS REFERENCE TO PRIOR APPLICATIONS

This application is a National Stage Application of PCT International Patent Application No. PCT/KR2015/007266 filed on Jul. 13, 2015, under 35 U.S.C. § 371, which claims priority to Korean Patent Application No. 10-2014-0123723 filed on Sep. 17, 2014, which are all hereby incorporated by reference in their entirety.

TECHNICAL FIELD

The present invention relates to a floating wind power generation device that produces electricity using wind in a state in which the floating wind power generation device is disposed to float on the sea.

BACKGROUND ART

In general, offshore structures can be moored in a floating state on a surface of the sea and are classified into various types according to functions, structures, and mooring methods. For example, these offshore structures include many types of offshore structures including Semi-Submersible (SEMI) offshore structures, Tensioned Leg Platform (TLP) offshore structures, spar type offshore structures, Floating Production, Storage and Off-loading (FPSO) offshore structures, Floating Storage Re-gasification Unit (FSRU) offshore structures, or drilling rigs.

Recently, the concern about alternative energy for replacing thermal power generation—nuclear power generation, and ocean current generation increases, and research and development into substantial devices for the use thereof are carried out, and in particular, the concern about an offshore power generation device that simultaneously uses wind power energy through an offshore structure that floats on the surface of the sea, and development thereof have highlighted.

However, in a floating offshore wind power generation device according to the related art, a roll motion in which a body of a ship of an offshore structure is shaken to the left/right, occurs so that power generation efficiency is lowered.

Such a floating offshore wind power generation device according to the related art is disclosed in Korean Patent Laid-open Publication No. 2013-0048853 (May 13, 2013).

DETAILED DESCRIPTION OF THE INVENTION

Technical Problem

The present invention provides a floating wind power generation device that enables power generation by wind while maintaining a stable floating state on the sea.

Technical Solution

According to an aspect of the present invention, there is provided a floating wind power generation device including: a main buoyant body which has buoyancy, so as to float on the sea, and has a space portion provided in the center; an auxiliary buoyant body which is connected to the main buoyant body by being inserted into the space portion of the main buoyant body and which has buoyancy; a plurality of wind power generators which are vertically provided on top of the auxiliary buoyant body and generate power; a location control means which is connected to the main buoyant body and controls the location of the main buoyant body; an oscillation inhibiting means which is connected to the main buoyant body and enables the main buoyant body to maintain an equilibrium state by absorbing the sea waves; and a dock connection unit which is connected to the main buoyant body and enables a ship to lie at anchor on the sea.

The location control means may include: a plurality of support frames which include a pair of basic bar members disposed to face each other at one side and the other side thereof and a support bar connecting the pair of basic bars and which are spaced apart from each other in a circumferential direction of the main buoyant body; a motion plate which has an airfoil cross-sectional structure and of which both sides are rotatably connected to the basic bar members by being disposed between the basic bar members; a plate-shaped linkage plate having elasticity, which is connected to one end of the motion plate by being disposed between the basic bar members and has both sides on which a connection bar is formed; a rotation power generator which is connected to the connection bar at one side of the linkage plate by being installed at the basic bar member at one side thereof and produces power by rotation of the linkage plate that makes a vertical motion due to the waves on the sea; a rotation driving unit which is connected to the connection bar at the other side of the linkage plate installed at the basic bar member at the other side thereof, is electrically connected to the rotation power generator and generates a driving force by power supplied from the rotation power generator so that the linkage plate is rotated; and a driving controller which is electrically connected to the rotation power generator and the rotation driving unit and controls whether power produced by the rotation power generator is supplied to the rotation driving unit.

The rotation power generator may include: a power generation gear box including a first crank shaft having one end coupled to a first rotation shaft and the other end on which a first fly wheel is disposed and a first link member having one end coupled to the first fly wheel and the other end connected to a connection bar at one side of the linkage plate; and a power generator which is connected to the first rotation shaft of the power generation gar box and produces power by a rotational force of the first rotation shaft.

The rotation driving unit may include: a driving gear box including a second crank shaft having one end coupled to a second rotation shaft and the other end on which a second fly wheel is disposed and a second link member having one end coupled to the second fly wheel and the other end connected to a connection bar at the other side of the linkage plate; a deceleration gear box connected to the second rotation shaft of the driving gear box; and a driving motor connected to the deceleration gear box.

The oscillation inhibiting means may include: a plurality of first absorption plates which are spaced apart from each other in the circumferential direction of the main buoyant body and each have one end rotatably coupled to the main buoyant body in a vertical direction by means of a hinge; and a second absorption plate rotatably hinge-coupled to the other end of each of the plurality of first absorption plates in the vertical direction.

The oscillation inhibiting means may further include a connection wire having a structure of a ring that connects the second absorption plates.

The dock connection unit may include: a bar-shaped connection arm connected to an outside surface of the main buoyant body to protrude in a direction of an outside of the main buoyant body; and a transportation rail which is installed at a top surface of the connection arm in a longitudinal direction and enables articles to be unloaded from the ship to be transported.

Each of the wind power generators may produce a total amount of power of 1 to 1.2 GW, and a substation facility connected to the wind power generators may be further installed on top of the individual structures of the auxiliary buoyant body.

Effect of the Invention

As described above, in a floating wind power generation device according to the present invention, sea waves generated on the sea in a state in which a plurality of wind power generators are installed on top of an auxiliary buoyant body placed in a space portion of a main buoyant body, are absorbed by means of vertical reciprocating motion energy, generated by an oscillation inhibiting means as well as a location control means, so that the main buoyant is prevented from shaking due to the effect of the sea waves and maintains an equilibrium state, thereby enabling stable wind power generation.

BEST MODE

Hereinafter, exemplary embodiments of the present invention will be described in detail with reference to the accompanying drawings.

Figure 1:
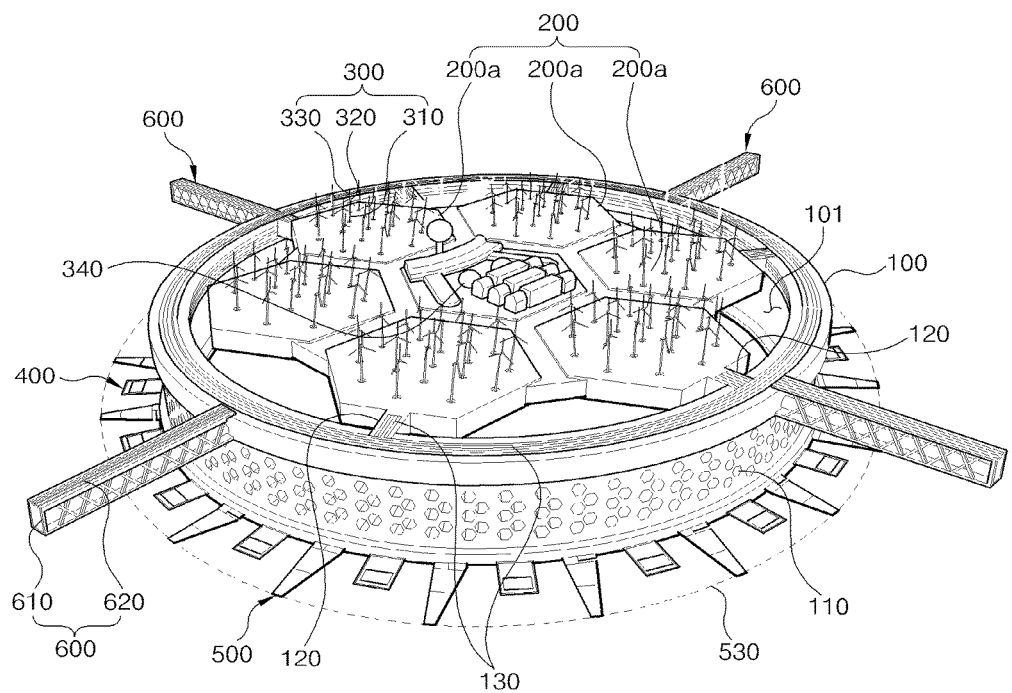
FIG. 1 is a perspective view of a floating wind power generation device according to an embodiment of the present invention.
Figure 2:
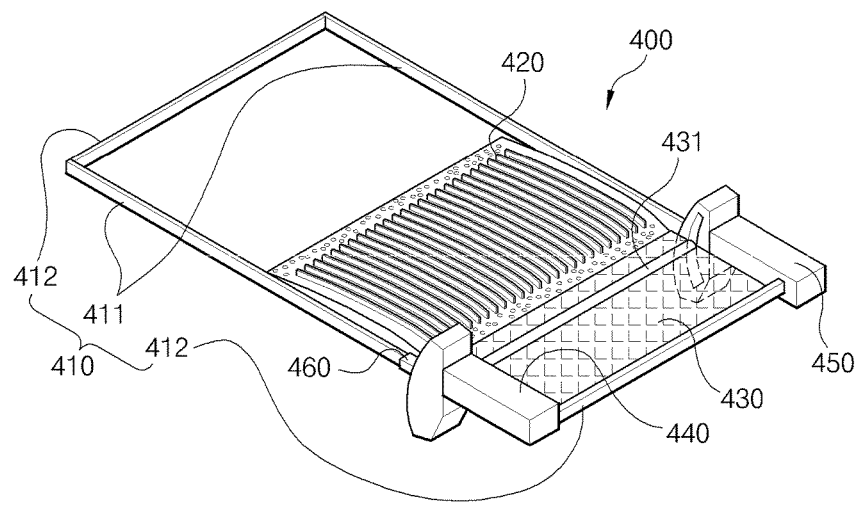
FIG. 2 is a perspective view of a location control means illustrated in FIG. 1.

FIG. 1 is a perspective view of a floating wind power generation device according to an embodiment of the present invention, and FIG. 2 is a perspective view of a location control means illustrated in FIG. 1. Referring to FIGS. 1 and 2, the floating wind power generation device includes a main buoyant body 100, an auxiliary buoyant body 200, a wind power generator 300, a location control means 400, an oscillation inhibiting means 500, and a dock connection unit 600.

The main buoyant body 100 is a structure to be supported in a state in which the auxiliary buoyant body 200, the wind power generator 300, the local control means 400, the oscillation inhibiting means 500 and the dock connection unit 600, which will be described below, are installed. The main buoyant body 100 that is the structure having buoyancy to float on the sea is illustrated as a circular ring structure having a space portion 101 formed in the center thereof so that the auxiliary buoyant body 200 that will be described later can be inserted into the space portion 101. However, embodiments of the present invention are not limited thereto, and a structure may be formed to have a rectangular ring or various other ring shapes, or a structure having the space portion 101 formed on a block structure having various shapes as well as a circular block structure may also be used.

A plurality of through holes 110 are formed through the periphery of outside walls of the main buoyant body 100 so that a contact area between the main buoyant body 100 and a water plane is reduced and thus a wave-making resistance applied to the main buoyant body 100 is reduced and motion performance of the main buoyant body 100 is improved.

In addition, a support 120 is coupled to the main buoyant body 100 so that the auxiliary buoyant body 200 can be connected to and supported by the support 120 in a state in which the auxiliary buoyant body 200 that will be described below is inserted into the space portion 101. The support 120 that is a bar-shaped member has one end connected to the main buoyant body 100 and the other end connected to the auxiliary buoyant body 200.

A transportation rail 130 may be formed on each of a top surface of the main buoyant body 100 and on a top surface of the support 120 so as to transport an article unloaded from a ship and transported by the dock connection unit 600 that will be described below, to a desired place.

The auxiliary buoyant body 200 is a plate-shaped structure that increases buoyancy of the main buoyant body 100 and further connects and supports the wind power generator 300 that will be described later. The auxiliary buoyant body 200 is coupled to the main buoyant body 101 by means of the support 120 in a state in which the auxiliary buoyant body 200 is inserted into the space portion 101 of the main buoyant body 100, as described above. Here, the auxiliary buoyant body 200 includes a plurality of plate-shaped individual structures 200a having buoyancy. That is, the auxiliary buoyant body 200 has a structure in which the plurality of individual structures 200a are disposed in parallel in the same horizontal line and are connected to each other. The wind power generator 300 that will be described below is installed on top of the individual structures 200a. Furthermore, a substation facility 340 for converting a voltage or current of power produced by the wind power generator 300 that will be described below or for supplying power to a facility outside the main buoyant body 100 may be provided on top of the individual structures 200a of the auxiliary buoyant body 200.

A plurality of wind power generators 300 are power generation facilities that are installed on the auxiliary buoyant body 200 to be spaced apart from each other and produce power using wind power generated on the sea. The wind power generators 300 are connected to the auxiliary buoyant body 200 to protrude upwardly in a state in which the wind power generators 300 are vertically disposed on top of the auxiliary buoyant body 200. Here, each of the wind power generators 300 includes a tower 310 having a bottom end coupled to a top surface of the auxiliary buoyant body 200 while being vertically disposed on top of the auxiliary buoyant body 200, a nacelle 320 that is connected to an upper portion of the tower 310 and generates electricity from a rotational force of a blade 330, and the blade 330 that is rotatably installed at the nacelle 320 and rotates by wind power. In this case, a total amount of power produced by the plurality of wind power generators 300 may be 1 to 1.2 GW.

The location control means 400 is connected to the main buoyant body 100 to control a location of the main buoyant body 100 on the sea. A plurality of location control means 400 are installed to be spaced apart from each other in a circumferential direction of an outside of the main buoyant body 100. Here, each of the plurality of location control means 400 includes a support frame 410, a motion plate 420, a linkage plate 430, a rotation power generation unit 440, a rotation driving unit 450, and a driving controller 460.

The support frame 410 is a frame member that supports the motion plate 420 that will be described below, the rotation power generation unit 440, and the rotation driving unit 450. Here, the support frame 410 has a structure of a rectangular frame including a pair of support bars 412 that, in a state in which a pair of basic bar members 411 are disposed at one side and the other side of the support frame 410 to face each other, enables both ends of each of the basic bar members 411 in a longitudinal direction to be connected to each other. A plurality of support frames 410 are disposed to be spaced apart from each other in the circumferential direction of the outside of the main buoyant body 100 and are connected to outsides of the plurality of support frames 410. Here, the motion plate 420 is disposed at an inside of each of the support frames 410, in more detail, between the basic bar members 411, and both sides of the motion plate 420 are rotatably connected to the basic bar members 411. The rotation power generation unit 440 is coupled to the basic bar members 411 placed at both sides of each of the support frames 410, in more detail, at one side of each of the support frames 410, and the rotation driving unit 450 is coupled to the basic bar member 411 placed at the other side of each of the support frames 410.

The motion plate 420 is disposed at an inside of each of the support frames 410, i.e., between the basic bar members 411, and both sides of the motion plate 420 are rotatably hinge-connected to the basic bar members 411. The motion plate 420 has an airfoil cross-sectional structure so that a flow of a fluid on the sea can be smoothly performed. Here, the motion plate 420 generates motion energy in an opposite direction to a direction in which sea-wave motion energy is generated. That is, because the motion plate 420 makes a rotational motion due to the effect of the sea waves to generate motion energy, the location of the main buoyant 100 is not changed due to the effect of the sea waves.

A plurality of protrusions 421 may be formed in a longitudinal direction of a top surface of the motion plate 420 and in a longitudinal direction of a bottom surface thereof. Here, the protrusions 421 generate turbulence on the surface of the top surface and the surface of the bottom surface of the motion plate 420 to increase a propulsive force and buoyancy. That is, the protrusions 421 increase motion energy generated when the motion plate 420 makes a rotational motion due to the effect of the sea waves.

Figure 3:
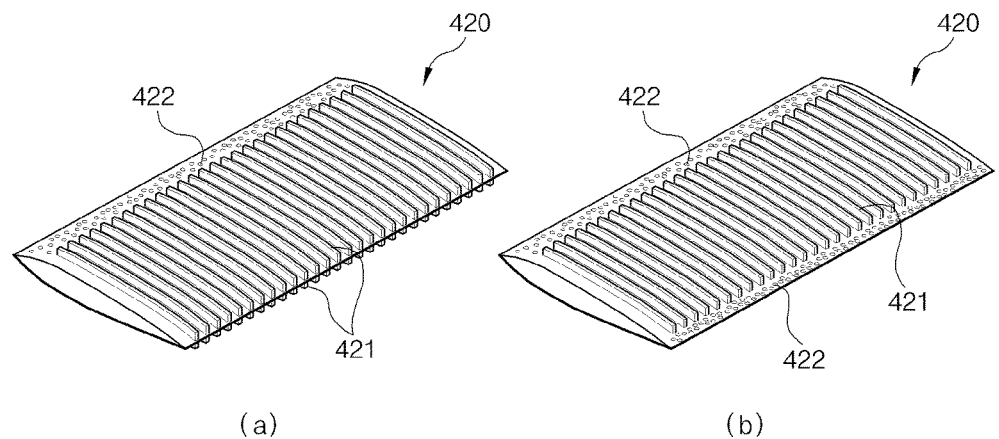
FIG. 3 is an enlarged perspective view of a motion plate illustrated in FIG. 2.

Referring to FIG. 3, a plurality of dimples 422 or protrusions (not shown in the drawing) may also be formed at edges of the top and bottom surfaces of the motion plate 420, i.e., adjacent to the above-described protrusions 421 in a longitudinal direction of the motion plater 420. Here, it is obvious that the dimples 422 or protrusions may also be formed on the entire surface of the top and bottom surfaces of the motion plate 420 instead of the plurality of protrusions 421 formed on the top and bottom surfaces of the motion plate 420.

The linkage plate 430 is a plate-shaped member that is connected to one end of the motion plate 420, i.e., an opposite end of the motion plate 420 to an end toward an outside of the main buoyant body 100 and is linked when the motion plate 420 makes a rotational motion on the support frames 410. In this case, the linkage plate 430 is formed as a plate having elasticity to increase motion energy in a vertical direction when the linkage plate 430 makes a motion by motion energy generated from the motion plate 420 so as to correspond to the motion plate 420.

One end of the linkage plate 430 is connected to one end of the motion plate 420 by being disposed at an inside of the support frames, in more detail, between the basic bar members 411. In this case, connection bars 431 protrude from both sides of the linkage plate 430, i.e., side surfaces facing the basic bar members 411 and are connected to the rotation power generation unit 440 and the rotation driving unit 450, respectively, which will be described below. That is, the rotation power generation unit 440 is connected to the connection bar 431 formed at one side of the linkage plate 430, and the rotation driving unit 450 is connected to the connection bar 431 formed at the other side of the linkage plate 430.

Figure 4:
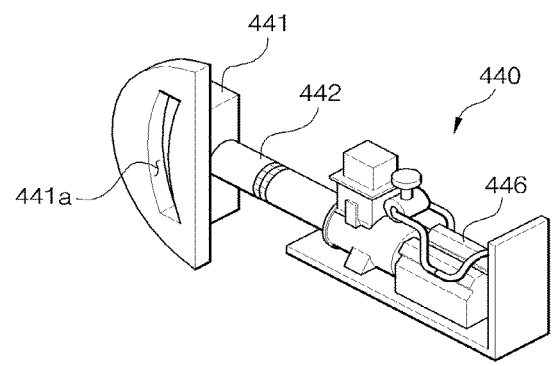
FIG. 4 is a schematic perspective view of a rotation generator illustrated in FIG. 2.

The rotation power generation unit 440 changes motion energy delivered from the linkage plate 430 into electrical energy to produce power when the linkage plate 430 makes a reciprocating motion in the vertical direction as a rotational motion of the motion plate 420 occurs due to the waves on the sea. The rotation power generation unit 440 is connected to the connection bar 431 at one side thereof by being coupled to the basic bar member 411 at one side thereof. Referring to FIG. 4, the rotation power generation unit 440 includes a power generation gear box 441 and a power generator 446.

Figure 6:
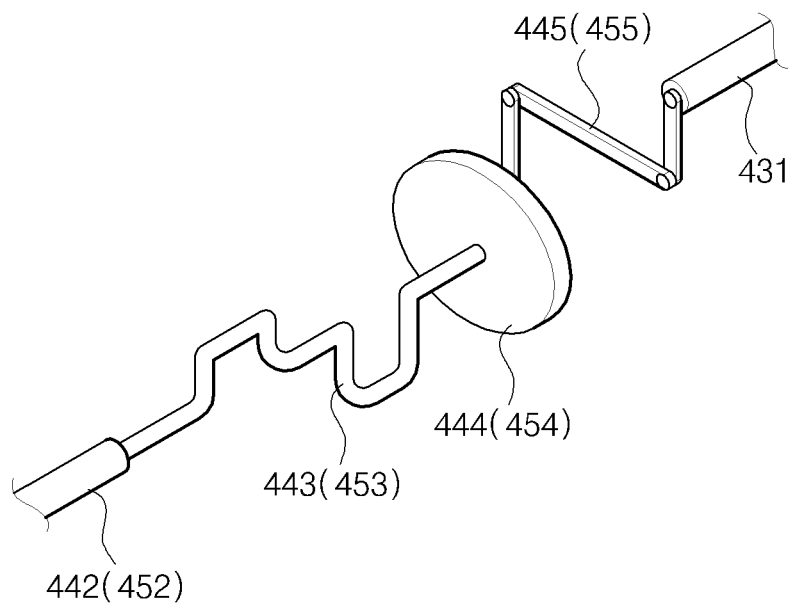
FIG. 6 is a schematic configuration view of a gear box illustrated in FIGS. 4 and 5.

The power generation gear box 441 changes a vertical reciprocating motion of the motion plate 420 and the linkage plate 430 into a rotational motion. Referring to FIG. 6, the power generation gear box 441 includes a first crank shaft 443 having one end coupled to a first rotation shaft 442 and the other end on which a first fly wheel 444 is placed, and a first link member 445 having one end coupled to the first fly wheel 444 and the other end connected to the connection bar 431 at one side of the linkage plate 430. In this case, a guide groove 441a is formed through one side of the power generation gear box 441 to guide the connection bar 431 at one side of the linkage plate 430 to be moved in the vertical direction.

The power generator 446 is connected to the first rotation shaft 442 of the power generation gear box 441. The power generator 446 produces power by a rotational force of the first rotation shaft 442.

When, in this way, the linkage plate 430 makes a vertical motion while being linked to a motion of the motion plate 420 that is vertically moved by the sea waves, the connection bar 431 at one side of the linkage plate 430 is vertically moved along the guide groove 441a of the power generation gear box 441, and when the connection bar 431 is vertically moved, the first link member 445 connected to the connection bar 431 rotates the first fly wheel 444 so that the first rotation shaft 442 rotates and the power generator 446 is driven by the rotational force of the first rotation shaft 442 to produce power.

Here, it is obvious that the rotation power generation unit 440 may include a battery facility (not shown in the drawing) capable of storing power produced by the power generator 446.

Figure 5:
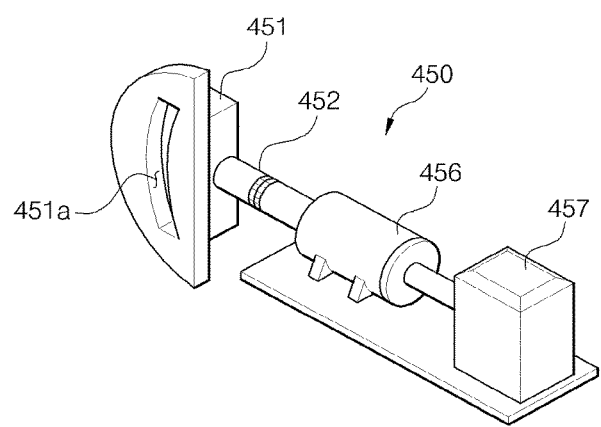
FIG. 5 is a schematic perspective view of a rotation driving unit illustrated in FIG. 2.

The rotation driving unit 450 is driven by power produced by the rotation power generation unit 440 and allows the linkage plate 430 to make a reciprocating motion in the vertical direction. The rotation driving unit 450 is connected to the connection bar 431 at the other side of the linkage plate 430 while being coupled to the basic bar member 411 at the other side thereof. Furthermore, the rotation driving unit 450 is electrically connected to the rotation power generation unit 440. Referring to FIG. 5, the rotation driving unit 450 includes a driving gear box 451, a deceleration gear box 456, and a driving motor 457.

The driving gear box 451 changes a rotation motion of a driving motor that will be described below, into a vertical reciprocating motion so that the motion plate 420 and the linkage plate 430 make a reciprocating motion in the vertical direction. Referring to FIG. 6, the driving gear box 451 includes a second crank shaft 453 having one end coupled to a second rotation shaft 452 and the other end on which a second fly wheel 454 is placed, and a second link member 455 having one end coupled to the second fly wheel 454 and the other end connected to the connection bar 431 at the other side of the linkage plate 430. In this case, a guide groove 451a is formed through the other side of the driving gear box 451 to guide the connection bar 431 at the other side of the linkage plate 430 to be moved in the vertical direction. Here, it is obvious that a clutch means that allows transmission of power to be selectively cut off may be provided on the second rotation shaft 452.

The deceleration gear box 456 reduces a rotation speed generated in the driving motor 457 to deliver the rotation speed to the driving gear box 451. That is, the deceleration gear box 456 is installed to be connected to the second rotation shaft 452 of the driving gear box 456 and a driving shaft of the driving motor 457, respectively, by having a deceleration gear (not shown in the drawing) provided inside thereof.

The driving motor 457 generates a driving force so that the connection bar 431 at the other side of the linkage plate 430 can be moved in the vertical direction. The driving motor 457 is installed in such a way that the driving shaft thereof is connected to a shaft portion of the deceleration gear box 465 in a state in which the driving motor 457 is coupled to the basic bar member 411 disposed at the other side of the support frame 410.

The driving controller 460 controls an operation of the rotation driving unit 450. That is, the driving controller 460 is electrically connected to the power generator 446 of the rotation power generation unit 440 and the driving motor 457 of the rotation driving unit 450 to control whether power produced by the rotation power generation unit 440 is supplied to the rotation driving unit 450. In this case, the driving controller 460 forces the motion plate 420 to be arbitrarily driven when an environment or condition of the sea is deteriorated and wind or waves are severe and the location of the main buoyant body 100 is not controlled only by motion energy generated in the motion plate 420. Here, it is obvious that the driving controller 460 may include a detector (not shown in the drawing) capable of measuring the intensity of wind or waves on the sea.

Furthermore, it is obvious that a global positioning system (GPS)(not shown in the drawing) is additionally provided at the location control means 400 to receive a current location of the main buoyant body 100 and then to drive the driving motor 457 of the rotation driving unit 450 based on received location data so that the location of the main buoyant body 100 can be controlled.

Figure 7:
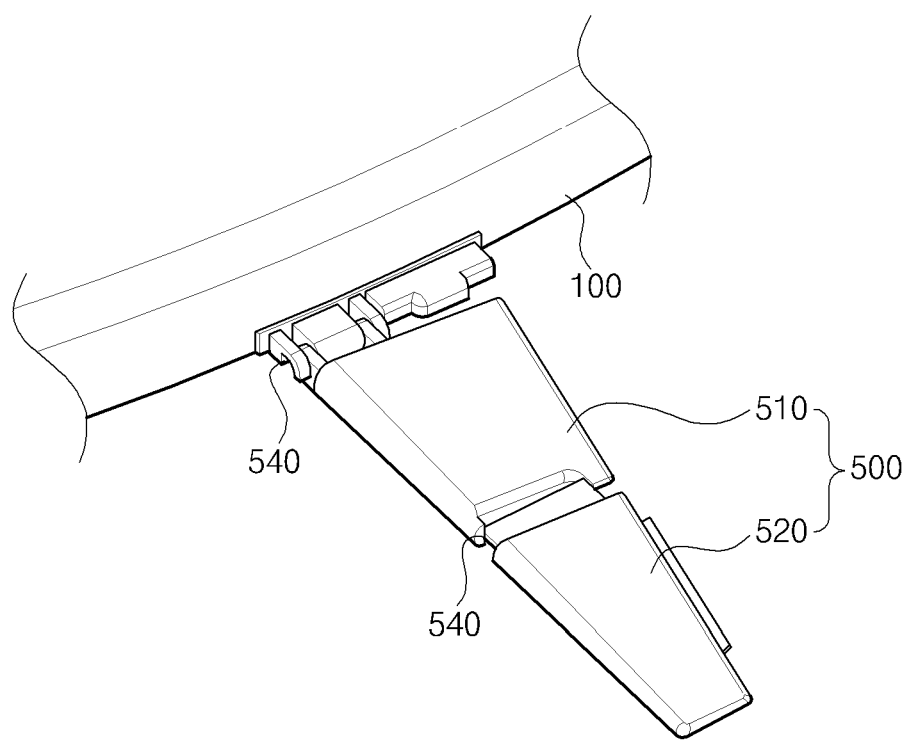
FIG. 7 is a perspective view of an oscillation inhibiting means illustrated in FIG. 1.

The oscillation inhibiting means 500 absorbs wave motion energy of the sea delivered to the main buoyant body 100 so that the main buoyant body 100 can maintain a stable equilibrium state on the sea. That is, the oscillation inhibiting means 500 makes a reciprocating motion in the vertical direction due to the waves of the sea to generate motion energy and to absorb the sea waves. A plurality of oscillation inhibiting means 500 are installed to be spaced apart from each other in the circumferential direction of the outside of the main buoyant body 100. Referring to FIG. 7, the oscillation inhibiting means 500 includes a first absorption plate 510 and a second absorption plate 520.

The first absorption plate 510 is a plate-shaped member in which a plurality of first absorption plates 510 are spaced apart from each other in the circumferential direction of the outside of the main buoyant body 100 and each have one end connected to the outside of the main buoyant body 100. One end of each of the first absorption plates 510 is rotatably connected to the outside of the main buoyant body 100 in the vertical direction by means of a hinge 540.

The second absorption plate 520 is a plate-shaped member contacted to the first absorption plate 510. One end of the second absorption plate 520 is rotatably connected to the other end of each of the first absorption plate 510 in the vertical direction by means of the hinge 540.

Because, in this way, the first absorption plate 510 and the second absorption plate 520 are rotatably connected to each other in the vertical direction and the first absorption plate 510 is rotatably connected to the main buoyant 100 in the vertical direction, the first absorption plate 510 and the second absorption plate 520 make a rotation motion in the vertical direction due to the effect of the sea waves to generate and absorb motion energy, and the main buoyant 100 is prevented from shaking due to the effect of the sea waves and maintains an equilibrium state.

In this case, a connection wire 530 having a structure of a ring that connects the second absorption plates 520 spaced apart from each other in a circumferential direction of the main buoyant 100, may be installed at the oscillation inhibiting means 500. The connection wire 530 delivers the rotation motion, generated in the first absorption plate 510 and the second absorption plate 520 due to the effect of the sea waves in the vertical direction, to the first absorption plate 510 and the second absorption plate 520 so that the effect of the sea waves can be inhibited from being delivered to the main buoyant body 100.

The dock connection unit 600 is a structure that enables an operating ship to lie at anchor on the main buoyant body 100 on the sea. The dock connection unit 600 is disposed so that one end thereof is connected to the main buoyant body 100 and the other end thereof protrudes from an outside of the main buoyant body 100 to enable the ship to lie at anchor stably. Here, the dock connection unit 600 includes a connection arm 610 and a transportation rail 620.

The connection arm 610 is a bar-shaped member connected to the main buoyant body 100 to protrude from the outside of the main buoyant body 100. That is, one end of the connection arm 610 is connected to an outside surface of the main buoyant body 100, and the other end of the connection arm 610 extends to protrude from the outside of the main buoyant body 100. In this case, a height of a top surface of the connection arm 610 is formed to correspond to a height of the top surface of the main buoyant body 100 so that an article to be unloaded from the ship onto the connection arm 610 can be stably transported.

The transportation rail 620 is installed at the top surface of the connection arm 610 to extend in a longitudinal direction and enables the article to be unloaded from the ship to an upper portion of the connection arm 610 to be easily transported in a direction of the main buoyant body 100. In this case, the transportation rail 610 installed at the connection arm 610 is connected to the transportation rail 130 formed on the main buoyant body 100 so that the article can be easily transported to a desired position via the transportation rail 610.

An operation of the floating wind power generation device having the above configuration according to an embodiment of the present invention will be described as below.

First, when the main buoyant body 100 is disposed to float on the sea, the blade 330 of the wind power generator 300 is rotated due to wind generated on the sea so that power can be produced by the nacelle 320.

In this case, the waves generated on the sea are maintained in a stable equilibrium state when the motion energy is absorbed by the location control means 400 and the oscillation inhibiting means 500. That is, due to the waves of the sea, the motion plate 420 and the linkage plate 430 of the location control means 400 make a rotation motion in the vertical direction, generate motion energy and absorb the waves, and the first absorption plate 510 and the second absorption plate 520 of the oscillation inhibiting means 500 also make a rotation motion in the vertical direction, generate motion energy and absorb the waves.

If the waves generated on the sea are out of a predetermined range and severe, the rotation driving unit 450 of the location control means 400 forces the motion plate 420 to be driven and controls a location thereof.

That is, when the driving motor 457 of the rotation driving unit 450 is driven by power generated by the power generator 446 of the rotation power generator 440, the second rotation shaft 452 of the driving gear box 451 rotates, and when the second rotation shaft 452 rotates, the second crank shaft 453 is rotated so that the second link member 455 operates.

When, in this way, the second link member 455 operates, the connection bar 431 at the other side of the linkage plate 430 is linked to the second link member 455 and makes a reciprocating motion in the vertical direction along the guide groove 451a of the driving gear box 451. When the connection bar 431 at the other side of the linkage plate 430 makes a reciprocation motion in the vertical direction, the motion plate 431 also makes a reciprocating motion in the vertical direction so that a floating position of the main buoyant body 100 can be adjusted.

In this way, in the floating wind power generation device according to an embodiment, in a state in which the plurality of wind power generators 300 are installed on top of the auxiliary buoyant body 300 disposed in the space portion 101 of the main buoyant body 100, the waves generated on the sea are absorbed by vertical reciprocating motion energy generated by the oscillation inhibiting means 500 as well as the location control means 400 so that the main buoyant body 100 is prevented from shaking due to the effect of the waves and maintains an equilibrium state, thereby enabling stable wind power generation.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A floating wind power generation device comprising:
    a main buoyant body which has buoyancy, so as to float on the sea, and has a space portion provided in the center;
    an auxiliary buoyant body which is connected to the main buoyant body by being inserted into the space portion of the main buoyant body, the auxiliary buoyant body including a plurality of plate-shaped individual structures having buoyancy which are disposed in parallel and are connected to each other;
    a plurality of wind power generators which are vertically provided on top of the auxiliary buoyant body and generate power;
    a location control means which is connected to the main buoyant body and controls the location of the main buoyant body;
    an oscillation inhibiting means which is connected to the main buoyant body and enables the main buoyant body to maintain an equilibrium state by absorbing the sea waves; and
    a dock connection unit which is connected to the main buoyant body and enables a ship to lie at anchor on the sea,
    wherein the oscillation inhibiting means comprises:
    a plurality of first absorption plates which are spaced apart from each other in the circumferential direction of the main buoyant body and each have one end rotatably coupled to the main buoyant body in a vertical direction by means of a hinge;
    a plurality of second absorption plates rotatably hinge-coupled to the other end of each of the plurality of first absorption plates in the vertical direction; and
    a connection wire having a structure of a ring that connects the second absorption plates.

2. The floating wind power generation device of claim 1, wherein the location control means comprises:
    a plurality of support frames which comprise a pair of basic bar members disposed to face each other at one side and the other side thereof and a support bar connecting the pair of basic bars and which are spaced apart from each other in a circumferential direction of the main buoyant body;
    a motion plate which has an airfoil cross-sectional structure and of which both sides are rotatably connected to the basic bar members by being disposed between the basic bar members;
    a plate-shaped linkage plate having elasticity, which is connected to one end of the motion plate by being disposed between the basic bar members and has both sides on which a connection bar is formed;
    a rotation power generator which is connected to the connection bar at one side of the linkage plate by being installed at the basic bar member at one side thereof and produces power by rotation of the linkage plate that makes a vertical motion due to the waves on the sea;
    a rotation driving unit which is connected to the connection bar at the other side of the linkage plate installed at the basic bar member at the other side thereof, is electrically connected to the rotation power generator and generates a driving force by power supplied from the rotation power generator so that the linkage plate is rotated; and
    a driving controller which is electrically connected to the rotation power generator and the rotation driving unit and controls whether power produced by the rotation power generator is supplied to the rotation driving unit.

3. The floating wind power generation device of claim 2, wherein the rotation power generator comprises:
    a power generation gear box comprising a first crank shaft having one end coupled to a first rotation shaft and the other end on which a first fly wheel is disposed and a first link member having one end coupled to the first fly wheel and the other end connected to the connection bar at one side of the linkage plate; and a power generator which is connected to the first rotation shaft of the power generation gar box and produces power by a rotational force of the first rotation shaft.

4. The floating wind power generation device of claim 2, wherein the rotation driving unit comprises:
   a driving gear box comprising a second crank shaft having one end coupled to a second rotation shaft and the other end on which a second fly wheel is disposed and a second link member having one end coupled to the second fly wheel and the other end connected to the connection bar at the other side of the linkage plate;
   a deceleration gear box connected to the second rotation shaft of the driving gear box; and
   a driving motor connected to the deceleration gear box.

5. The floating wind power generation device of claim 1, wherein the dock connection unit comprises:
   a bar-shaped connection arm connected to an outside surface of the main buoyant body to protrude in a direction of an outside of the main buoyant body; and
   a transportation rail which is installed at a top surface of the connection arm in a longitudinal direction and enables articles to be unloaded from the ship to be transported.

6. The floating wind power generation device of claim 1, wherein each of the wind power generators produces a total amount of power of 1 to 1.2 GW, and a substation facility connected to the wind power generators is further installed on top of the individual structures of the auxiliary buoyant body.

* * * * *